United States Patent [19]

Boston

[11] Patent Number: 5,595,333
[45] Date of Patent: Jan. 21, 1997

[54] RACK FOR CARRYING A BOW OR LONG GUN ON AN ALL-TERRAIN VEHICLE

[76] Inventor: Leslie E. Boston, 2850 Tersita Rd., Owenton, Ky. 40359

[21] Appl. No.: 467,465

[22] Filed: Jun. 6, 1995

[51] Int. Cl.$^6$ ............................................. B60R 9/00
[52] U.S. Cl. ......................... 224/536; 224/532; 224/534; 224/537; 224/488; 211/60.1; 211/64
[58] Field of Search ...................... 224/401, 488, 224/489, 495, 501, 511, 512, 514, 515, 522, 523, 536, 534, 533, 524, 545, 554, 558, 567, 570, 403, 405, 546; 211/60.1, 64, 13

[56] References Cited

U.S. PATENT DOCUMENTS

| | | | |
|---|---|---|---|
| 2,248,170 | 7/1941 | Hansen | 224/570 |
| 2,561,199 | 7/1951 | Harder . | |
| 2,772,799 | 12/1956 | Bridinger | 224/536 |
| 2,835,424 | 5/1958 | Pierce | 224/514 |
| 3,329,278 | 7/1967 | Pachmayr | 211/64 |
| 4,116,341 | 9/1978 | Hebda | 224/515 |
| 4,176,771 | 12/1979 | Dubroc, Sr. | 224/39 |
| 4,355,746 | 10/1982 | Casady | 224/274 |
| 4,450,967 | 5/1984 | Castro | 211/12 |
| 4,696,374 | 9/1987 | Hale | 182/127 |
| 4,875,608 | 10/1989 | Graber | 224/514 |
| 4,957,229 | 12/1990 | Freeman | 224/405 |
| 5,174,622 | 12/1992 | Gutta | 296/77.1 |
| 5,219,105 | 6/1993 | Kravitz | 224/511 |
| 5,236,062 | 8/1993 | Laney | 182/127 |
| 5,236,110 | 8/1993 | Schmidt . | |
| 5,249,722 | 10/1993 | Horn | 211/64 |
| 5,370,240 | 12/1994 | Hand | 211/13 |

FOREIGN PATENT DOCUMENTS

| | | | |
|---|---|---|---|
| 3615839 | 1/1987 | Germany | 224/570 |
| 3900569 | 7/1990 | Germany | 224/511 |
| 2257463 | 1/1993 | United Kingdom | 224/570 |

OTHER PUBLICATIONS

"Modular Mounts" from Gamber Johnson; copyright 1989.

*Primary Examiner*—Henry J. Recla
*Assistant Examiner*—Gregory M. Vidovich
*Attorney, Agent, or Firm*—Laurence R. Letson

[57] ABSTRACT

A rack for transporting on an all-terrain vehicle (ATV) a long gun such as a rifle, shotgun, or a hunting bow has a clamping arrangement which engages the limbs of the hunting bow in a direction substantially normal to the limbs at the point of engagement and clamping. The rack further has support arms for holding and supporting a hunting seat such as a tree stand or deer stand for transportation. Additionally, the rack is provided with two detachable cradles which may be disposed on a portion of the clamping mechanism and clamped by the remainder of the clamping mechanism. The cradles have hook-shaped support surfaces disposed for supporting and holding a long gun in a substantially horizontal orientation.

10 Claims, 3 Drawing Sheets

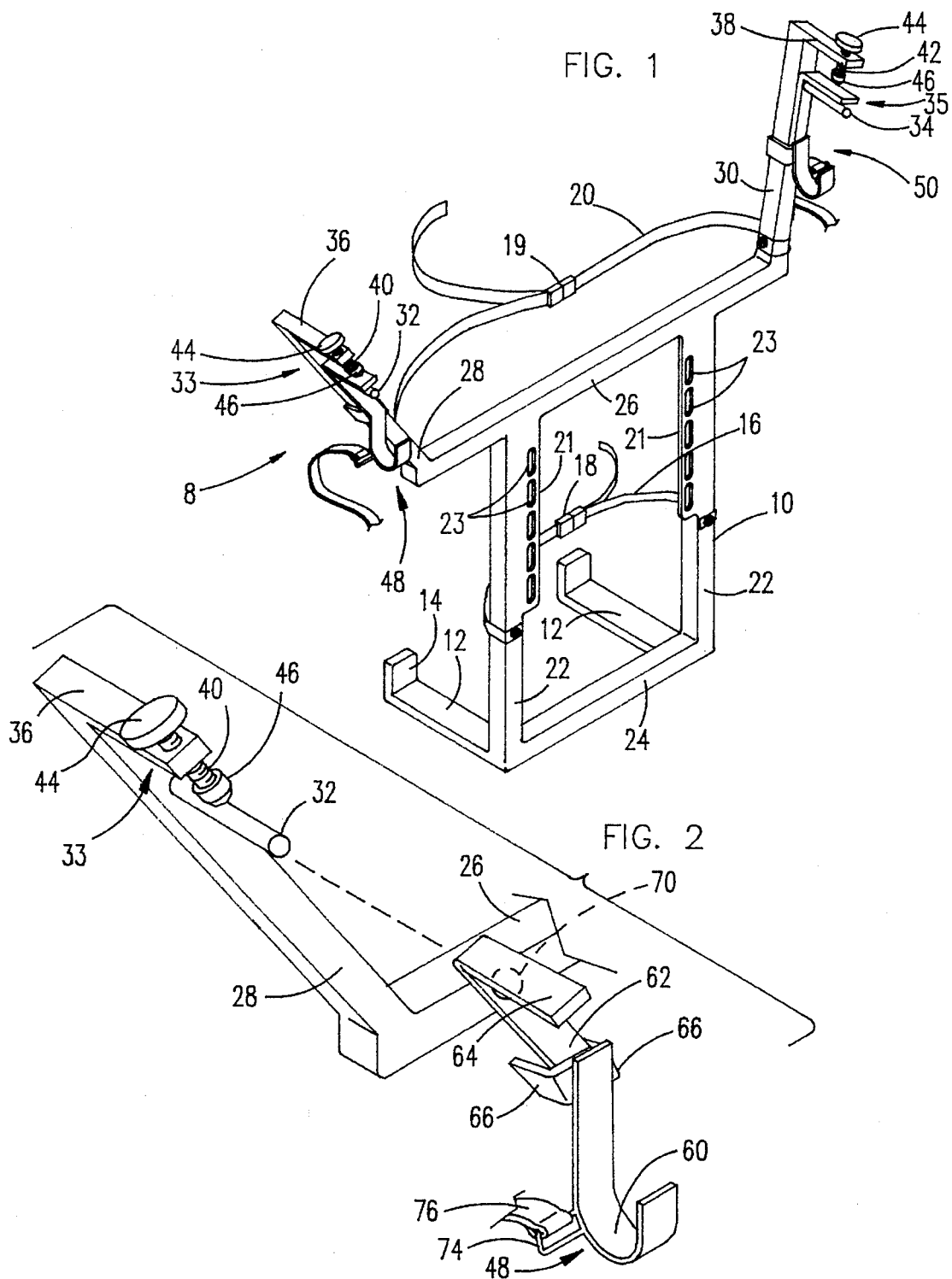

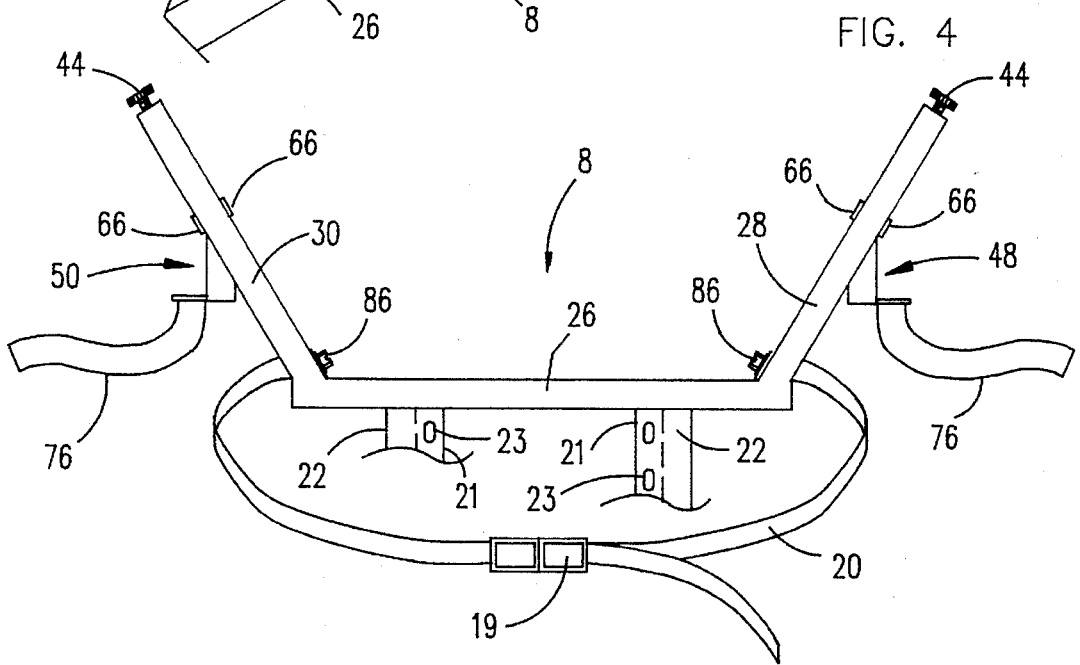

5,595,333

RACK FOR CARRYING A BOW OR LONG GUN ON AN ALL-TERRAIN VEHICLE

FIELD OF THE INVENTION

This invention relates to transport racks for all-terrain vehicles (ATVs) and more particularly to racks for transporting deer stands and tree stands together with a hunting weapon such as a bow or a gun.

BACKGROUND OF THE INVENTION

Long guns, which include rifles and shotguns but does not include hand guns or pistols, have been carried in scabbards on ATVs. However, carrying a hunting bow in a scabbard how not proved to be popular or practical.

Carrying a hunting bow on an ATV presents significant problems because hunting bows, particularly the compound bow type, typically have installed thereon stabilizers or counter-balance weights which extend from the bow and create significant barriers to the insertion of the bow into a scabbard type of holder. Counter-balance weights and other similar attachments including sights are attached to the bow and typically have required a significant time investment to adjust them to the point where the user of the bow is able to accurately place his shots. Accordingly, the devices are not readily detachable for transportation and then reinstallable after arrival at the point of use.

Accordingly, any carrying device must be able to mount or engage the bow without interfering with the other attachments such as stabilizers, sights, and the like.

Many ATVs utilize cargo racks or structures mounted on the front or rear of the ATV. Typically the cargo racks are fabricated from metal tubing, bent into the desired shape, and welded into a support platform and an end barrier. The end barrier prevents the cargo from slipping off the support platform and also can act as a brush guard whenever the ATV cargo rack is mounted on the front of the ATV. Examples of cargo racks for ATVs are the racks shown in U.S. Pat. No. 4,176,771 issued to Tryone P. Dubroc, Sr. and U.S. Pat. No. 5,236,062 issued to Roger C. Laney where the cargo rack is illustrated in phantom.

Camping gear and game do not provide a reliable base for carrying a weapon or a tree stand whenever loaded on the cargo racks.

OBJECTS OF THE INVENTION

It is an object of the invention to transport a hunting weapon and a tree or deer stand on an ATV without interfering with the use of the cargo carrying capacity of a cargo rack mounted on the ATV.

It is another object of the invention to reliably mount a hunting bow or a long gun on a rack of an ATV for transportation over rough terrain.

It is a still further object of the invention to provide attachments to convert a bow carrying rack to a rack for carrying a long gun.

SUMMARY OF THE INVENTION

This invention overcomes the problems of the prior art and accomplishes the objects of the invention, by a frame of rigid material attachable to the cargo rack of an ATV. The rack forms support arms to hold a tree stand also referred to as a deer stand. Straps are attached to the rack and may be used to secure the tree stand to the rack for transportation.

The rack is further provided with a pair or rods of shafts extending normal to the plane of the rack. The rack further supports clamp members. The clamp members, preferably a pair of screws with cup tips on one end and a knob on the other end, may be tightened onto the rods or shafts. The hunting bow may be placed with the limbs resting on the shafts. The screws tighten down onto the limbs of the bow forcing it onto the shafts. Thus clamped, the bow is firmly mounted for transportation and leaves the hands of the driver of the ATV free to control the vehicle.

The rack also provides a support for cradles that accommodate and support a long gun. The cradles include hooks in which the long gun rests and a plate which resides between the clamp member and the shaft. The cradle has a positioning hole to fit over the shaft. The plate is engaged by the clamp members and trapped against the shaft under the pressure exerted by the screw of the clamp member.

The cradles are provided with positioning tabs which fit against the sides of a portion of the frame of the rack to prevent the cradle from pivoting on the shaft.

The frame may conveniently be comprised of a pair of arms oriented so that the long axis of the arms are disposed generally perpendicular to the limbs of the bow. Thus, clamping of the limbs retains the bow on the rack without deforming the limbs of the bow or exerting undue deforming pressures onto the limbs.

The cradles are formed to fit the shaft and be oriented relative to the arms so that the hooks remain in a position whereby the supporting surfaces of the hooks remain generally horizontal. The cradles may be of differing lengths to maintain the long gun horizontal by accommodating the drop of the stock of the long gun.

The rack may be attached to the ATV cargo rack. In order to accomplish this attachment, the rack is disposed generally vertically and is clamped to the ATV cargo rack by "U" bolts and the rack may be mounted on either the front or rear cargo rack of the ATV.

A more detailed understanding of the invention may be had from the accompanying drawings and the detailed description of the invention to follow.

DRAWINGS

FIG. 1 is a perspective view of the bow/long gun/tree stand rack.

FIG. 2 is a perspective view of one of the arms and the clamping mechanism thereon together with one of the cradles which may be installed on the clamping mechanism to support one end of the long gun.

FIG. 3 is a perspective view of the other arm and cradle which similarly may be used to support one end of the long gun.

FIG. 4 is a rear view of the top portion of the frame, arms, and cradles fully installed.

Figure 5:
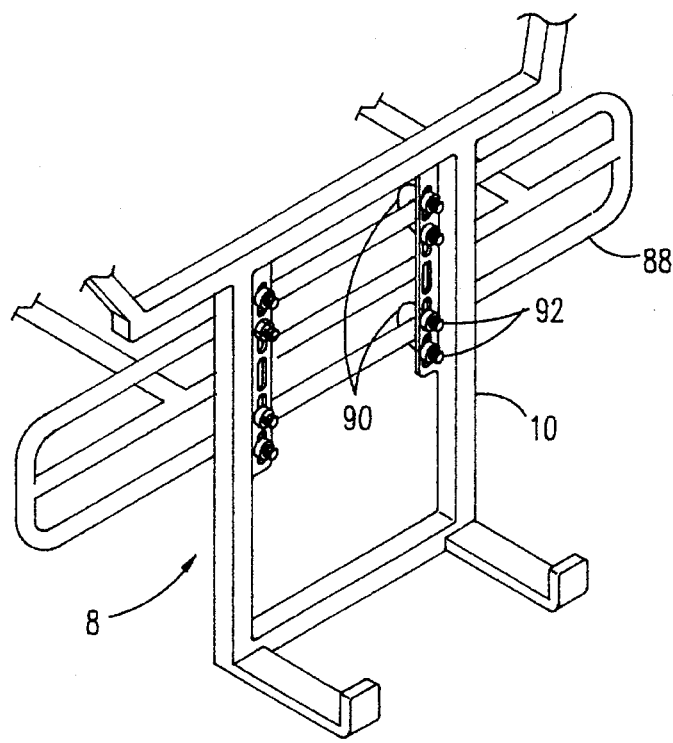
FIG. 5 illustrates the main body of the rack installed on an ATV cargo rack.

DETAILED DESCRIPTION OF THE PREFERRED EMBODIMENT OF THE BEST MODE AS CONTEMPLATED BY THE INVENTOR FOR CARRYING OUT THE INVENTION

Referring initially to FIG. 1, where the rack 8 for transporting the deer stand, sometimes referred to as a hunting seat, and either a hunting bow or long gun, referred to generally as hunting weapons, is shown. A generally rectangular frame 10 is preferably formed of hollow, square cross-section tubing. The square cross-sectional shape of the tubing provides very substantial strength.

Extending from the bottom of the frame are support arms 12 having upturned tabs 14 extending therefrom. The arms 12 and tabs 14 collectively provide an arrangement for supporting a tree stand, deer stand or hunting seat thereon. Attached to the main portion of frame 10 is a strap 16 having a buckle 18. The strap 16 may be wrapped around the deer stand and the buckle 18 engaged to retain the deer stand in a constrained position relative to frame 10. Although not shown, other fastening retainers, such as elastic shock cords or bungee cords, may also be used. Strap 20, having a buckle 19, functions similarly to further constrain the deer stand or similar device.

Frame 10 is conveniently formed of vertical tubular members 22 and horizontal tubular members 24, 26. In this example, the upper tubular member 26 is laterally extended beyond the vertical tubular members 22 and supports diverging arms 28, 30. Diverging arms 28, 30 are respectively provided with shafts 32 and 34. Similarly each of the diverging arms 28, 30 are provided with clamp arm 36, 38 which are each provided with an aperture, not shown, having internal threads for accepting screws 40 and 42, respectively.

Screws 40 and 42 are each provided with a knob 44 or handle 44 and an end cup 46. End cups 46 permit clamping engagement with a bow limb without damaging the bow surface. Knobs 44 are useful for rotating the screws 42, 44 to create a tightening or clamping action between end cup 46 and shaft 32, 34. Shafts 32, 34 further support cradles 48, 50 respectively. Cradles 48, 50 are useful in supporting and retaining a long gun for transportation.

For a more complete description of the clamping mechanism 33 and cradle 48, refer to FIG. 2., and for a better description of clamping mechanism 35 and cradle 50 refer to FIG. 3.

FIG. 2 is a partial view of the rack assembly of FIG. 1 with the cradle 48 exploded away from arm 28, shaft 32, and clamp 33. Cradle 48 is comprised of a hook support 60, a shank 62, and a cradle plate 64. Shank 62 and cradle plate 64 may be formed separately and attached to each other or may be formed integrally by bending cradle plate 64 at a substantially right angle to shank 62. Hook support 60 is attached to the end of shank 62. Attached to the shank 62 are the positioning tabs 66. Positioning tabs 66 are spaced apart sufficiently to be disposed on opposite sides of arm 28 when hole 70 is disposed over shaft 32. With hole 70 disposed over shaft 32 and positioning tabs 66 disposed on opposite sides of arm 28, knob 44 may be rotated to extend screw 40 relative to clamp arm 36 of clamping mechanism 33 thereby engaging end cup 46 with cradle plate 64. In order to retain the long gun 110 in FIG. 7, in engagement with the support surface of support hook 60, a ring 74 is attached to the support hook 60 and a retainer strap 76 attached to ring 74.

FIG. 3 illustrates diverging arm 30 of rack 8 extending from top horizontal member 26 and supporting shaft 34 and clamp arm 38 of clamping mechanism 35. Clamp arm 38, in an analogous manner to that of clamp arm 36 described in FIG. 2, supports knob 44, screw 42, and end cup 46. Cradle 50 is comprised of a support hook 60 is supported by shank 62. Shank 62 is provided with a hole 70 to accept shaft 34 thereby placing clamp plate 64, intermediate shaft 34, and end cup 46. Similar to cradle 48 in FIG. 2, cradle 50 is provided with tabs 66, one of which is visible, to prevent the pivoting of cradle 50 about shaft 34. The strap 76 disposed on ring 74 attached to support hook 60, is substantially the same as strap 76 on ring 74 in FIG. 2. The straps 76 in both figures are provided with hook 80 and loop 82 fastening elements for attaching the free end of strap 76 about a portion of the long gun. Other types of fasteners may be used if desired, but hook and loop fasteners are desirable because of the infinite adjustability of the engagement of strap 76 with the long gun and the fact that the hook and loop fasteners will not scratch or mar the stock or barrel of a long gun when used.

FIG. 4 illustrates the top portion of rack 8, particularly arms 28 and 30 which in turn support cradles 48 and 50, respectively. Tabs 66 are illustrated in their assembled position straddling arms 28, 30. Strap 20 is conveniently attached by any conventional technique to arms 28, 30 and are illustrated as attached with metal screws 86. Illustrated on the interior sides of vertical tubular members 22 are flanges 21 which have been pierced to provide mounting apertures 23 through which a "U" bolt may be inserted.

FIG. 5 illustrates a major portion of rack 8 attached by "U" bolts 90 to the end portion 88 of an ATV cargo rack. "U" bolts 90 and nuts 92 retain rack 8 on the end portion 88 of an ATV cargo rack.

Figure 6:
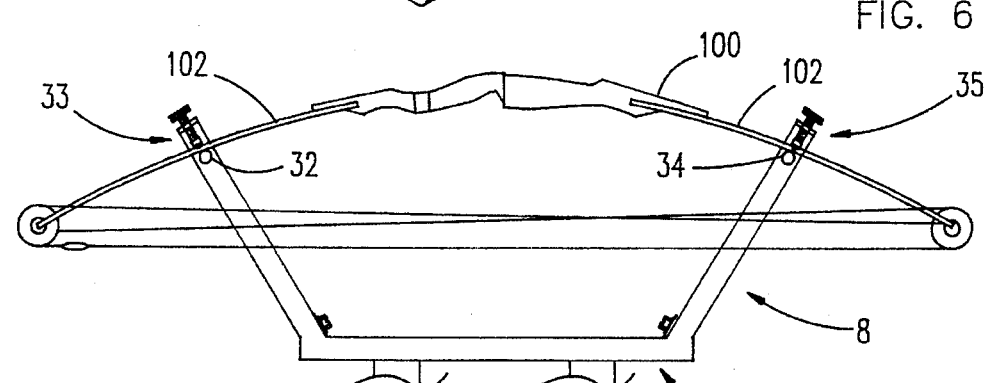
FIG. 6 illustrates the top portion of the rack and the clamps supporting a hunting bow.

Referring now to FIG. 6, one will appreciate how a hunting bow 100 is mounted on the rack 8. Bow 100 is disposed with the limbs 102 thereof lying on and supported by shafts 32 and 34. Clamping mechanisms 33 and 35 may then be tightened to retain the limbs 102 of bow 100 firmly against shafts 32, 34.

Figure 7:
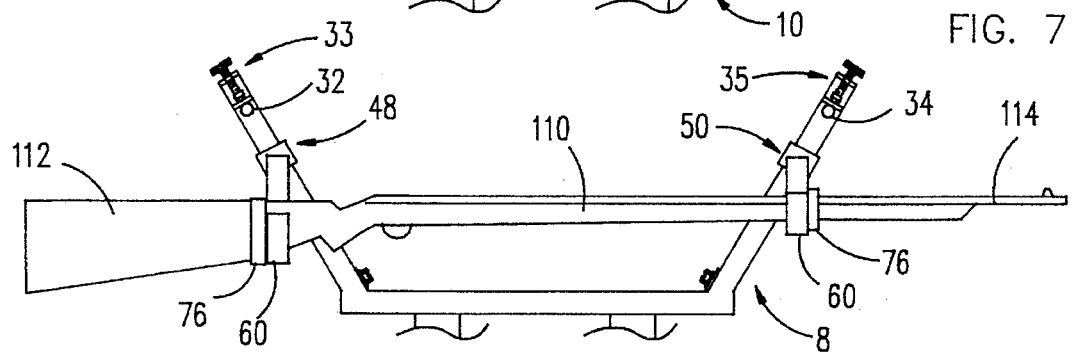
FIG. 7 illustrates the top portion of the rack with the cradles installed and supporting a long gun.

FIG. 7 illustrates the rack 8 assembled with cradles 48 and 50 installed and clamped by clamping mechanisms 33 and 35. Gun 110 is then disposed on the support hooks 60. One will note that cradle 48 has a support hook 60 which depends a greater distance than the support 60 of cradle 50. The longer length of the support hook 60 of cradle 48 accommodates the drop in the stock thereby maintaining the gun 110 in a horizontal position.

Retainer straps 76 are wrapped about the stock 112 and barrel 114 of gun 110 to hold the gun 110 in support hooks 60.

The entire rack 8 and the cradles 48 and 50 may be dip coated in a rubbery plastic coating for a variety of reasons. The dip coating will prevent corrosion of the rack 8 and the cradles 48, 50 as well as suppress the sound of any grass, branches, or other objects striking the rack 8 when the ATV is moving as well as muffling rattles of the deer stand against the rack 8 if carried on the rack 8.

Further, coating of the cradles 48, 50 will help to protect the stock and the barrel 114 of rifle 110 from being scratched or damaged by engagement with the cradles 48, 50.

The rack may be manufactured without the deer stand support arms if desired. Other clamp designs may be incorporated into the rack, such as an overcenter clamp, if there is a desire for quick release of the bow from the rack.

One of skill in the art will understand that minor changes and other modifications may be made to various aspects of the disclosed device without removing the resulting structure from the scope of the attached claims which are intended to define the scope of the invention.

I claim:

1. A rack for carrying an archery bow or a firearm comprising:

a frame, said frame forming a plane;

a first pair of arms attached to said frame and extending from said frame;

a rigid member protruding from each of said first pair of arms and projecting substantially normal to said plane, said rigid members disposed to support a hunting weapon;

said first pair of arms each having a second rigid member disposed on each of said arm substantially parallel to said first rigid member, each said second rigid member supporting a clamping member moveable relative to said second rigid member and engageable with said weapon, trapping said weapon between said clamping member and said first rigid member, thereby retaining said hunting weapon on said rack;

a second pair of arms projecting substantially normal to said plane from said frame, said second pair of arms further comprising retaining flanges, and retainer straps attached to said rack and disposable around a device supported on said second pair of arms for transportation.

2. The rack of claim 1 further comprising a flange attached to said frame, said flange further comprising a plurality of apertures permitting insertion of mounting fasteners for attaching said rack to a portion of a vehicle.

3. The rack of claim 1, wherein said clamp members comprise a screw threaded member threadedly engages with said second rigid members and tightenable against said weapon.

4. The rack of claim 1 further comprising apertures for mounting said rack with fasteners to a supporting structure on a vehicle.

5. A rack for supporting said transporting an archery bow or long gun comprising:

a frame;

said frame supporting a mounting and retaining device;

said frame further comprising a pair of arms projecting from said frame and disposed to support an object disposed thereon;

said mounting and retaining device comprising a rigid support member and a clamping member cooperatively disposed on said frame;

said clamping member comprising a threaded member having a manually operable turning member and an engaging end supported by said frame and movable relative to said rigid support member to engage said engaging end with a device disposed therebetween and force said device against said rigid member to clamp and retain said device on said rack;

said clamping member angularly disposed to exert forces for clamping onto an archery bow lamb at an angle substantially normal to said limb of said bow; and a cradle attachable to said rack, said cradle comprising a long gun support surface and an aperture formed and dimensioned to surround a segment of said rigid member permitting insertion of said rigid member into said aperture, and a clamping member engageable surface, said clamping member engageable surface disposed intermediate said rigid member and said clamping member.

6. The rack of claim 5 wherein said cradle further comprises a projecting tab disposed on said cradle and disposable relative to said frame preventing pivotal movement of said cradle about said rigid member.

7. The rack of claim 6, wherein said gun support surface is hook shaped and said cradle includes a fastenable retaining strap attached thereto for retaining a long gun on said support surface.

8. The rack of claim 7 wherein at least said rigid member, said clamp member, and said cradle are coated with a soft coating.

9. The rack of claim 7 wherein said strap comprises hook and loop fasteners.

10. The rack of claim 5 wherein said threaded member is tightenable onto said rigid member or onto said device disposed between said threaded member and said rigid member, wherein said threaded member exerts a retaining force onto and through said device against said rigid member to clamp and retain said device on said rack.

* * * * *